(12) United States Patent
Jørgedal et al.

(10) Patent No.: US 7,217,762 B1
(45) Date of Patent: May 15, 2007

(54) PROCESS FOR THE PREPARATION OF MONODISPERSE POLYMER PARTICLES

(75) Inventors: Arne Jørgedal, Raelingen (NO); Elin Marie Aksnes, Oslo (NO); Geir Fonnum, Rasta (NO); Astrid Evenrød Molteberg, Fetsund (NO); Rolf Nordal, Skedmokorset (NO); Henning Pettersen, Lillestrøm (NO); Tollef Taarneby, Auli (NO); Solveig Marle Staale, Rasta (NO); Ellen Weng, Oppegård (NO); Finn Knut Hansen, Strømmen (NO); Silje Steinbakk Nordbø, Oslo (NO); Oddvar Arnfinn Aune, Tiller (NO); Arvid Trygve Berge, Trondheim (NO); John Olav Bjørgum, Heimdal (NO); Turid Ellingsen, deceased, late of Norway (NO); Arvid Tryge Berge, legal representative, Trondheim (NO); John Ugelstad, deceased, late of Trondheim (NO); Viola Ugelstad, legal representative, Trondheim (NO)

(73) Assignee: Invitrogen Corporation, Carlsbad, CA (US)

( * ) Notice: Subject to any disclaimer, the term of this patent is extended or adjusted under 35 U.S.C. 154(b) by 0 days.

(21) Appl. No.: 09/958,431

(22) PCT Filed: Apr. 10, 2000

(86) PCT No.: PCT/GB00/01334

§ 371 (c)(1),
(2), (4) Date: Oct. 9, 2001

(87) PCT Pub. No.: WO00/61647

PCT Pub. Date: Oct. 19, 2000

(30) Foreign Application Priority Data

Apr. 9, 1999 (GB) .................................. 9908163.0
Mar. 22, 2000 (GB) .................................. 0007008.6

(51) Int. Cl.
*C08F 2/16* (2006.01)

(52) U.S. Cl. ...................... 524/800; 524/802; 524/804; 524/812; 524/819; 524/822; 524/823; 524/832

(58) Field of Classification Search ................ 524/800, 524/802, 804, 812, 819, 822, 823, 832
See application file for complete search history.

(56) References Cited

U.S. PATENT DOCUMENTS

| | | | |
|---|---|---|---|
| 4,224,415 A | 9/1980 | Meitzner et al. | |
| 4,256,840 A | 3/1981 | Meitzner | ...................... 521/33 |
| 4,297,220 A | 10/1981 | Meitzner | .................... 210/690 |
| 4,382,124 A | 5/1983 | Meitzner et al. | |
| 4,459,378 A | 7/1984 | Ugelstad | ..................... 523/205 |
| 4,501,826 A | 2/1985 | Meitzner | ...................... 521/19 |
| 4,530,956 A | 7/1985 | Ugelstad et al. | |
| 4,564,644 A | 1/1986 | Harris | |
| 5,834,524 A | 11/1998 | Bloodworth et al. | |

FOREIGN PATENT DOCUMENTS

| | | |
|---|---|---|
| EP | 0 003 905 A1 | 9/1979 |
| GB | 1 255 237 | 12/1971 |
| GB | 1 416 405 | 12/1975 |
| WO | 92/16581 | 10/1992 |
| WO | 93/12167 | 6/1993 |
| WO | 93/17055 | 9/1993 |
| WO | 97/40076 | 10/1997 |
| WO | 99/19375 | 4/1999 |
| WO | 00/61647 | 10/2000 |

OTHER PUBLICATIONS

Yuan, H.G. et al., *Rev. Macromol. Chem. Phys.* C31(2&3): 274-275 (1991).
Ellingsen, T. et al., *J. Chrom.* 535: 147-161 (1990).
Ugelstad, J. et al., *Adv. in Colloid and Interface Science* 13: 101-140 (1980).
Du Dongyun et al., Production of Antirust Paint by Using Polystyrene Foam Plastics, Hubei Chemical Industry, No. 1, 1995.
H. G. Yuan et al., Suspension Polymerization, Rev. Macromol. Chem. Phys., C31(261), 1991, 274-276.
Turid Ellingsen et al., Monosized Stationary Phases for Chromotography, Journal of Chromotography, 535, 147-161 (1990).
J. Ugelstad et al., Swelling of Oligomer Particles, Advances in Colloid Interface Science, 13, 1980, 101-140.

*Primary Examiner*—Edward J. Cain (57) ABSTRACT

A process for the preparation of monodisperse polymer particles which are formed by contacting monomers with aqueous dispersions comprising monodisperse swellable seed polymers/oligomers, and initiating polymerization in the presence of a steric stabilizer. The resulting swollen seed particles are characterized by the particle mode diameter.

98 Claims, 1 Drawing Sheet

Fig. 1

PROCESS FOR THE PREPARATION OF MONODISPERSE POLYMER PARTICLES

CROSS-REFERENCE TO RELATED APPLICATIONS

The application is the national phase of International (PCT) Patent Application Serial No. PCT/GB00/01334, filed Apr. 10, 2000, published under PCT Article 21(2) in English, which claims priority to and the benefit of United Kingdom Patent Application No. 9908163.0, filed Apr. 9, 1999, and United Kingdom Patent Application No. 0007008.6, filed Mar. 22, 2000.

This invention relates to improvements in and relating to the preparation of substantially monodisperse polymer particles.

Monodisperse polymer particles (i.e. particles with a coefficient of variation of less than 10%, preferably less than 5% and more preferably less than 3%) have been commercially available for several years and find applications in many technical fields, e.g. in pharmaceuticals, in separation processes, as toners, as filters, as spacers, etc.

Polymer beads may be produced by diffusing a monomer and a polymerization initiator (or catalyst) into polymer seeds in an aqueous dispersion. The seeds swell and following initiation of polymerization, e.g. by heating to activate the initiator, larger polymer particles are produced. The maximum volume increase due to swelling and polymerization is about x5 or less. The late Professor John Ugelstad found that the capacity of the seeds to swell could be increased to a volume increase of x125 or even more if an organic compound with relatively low molecular weight and low water solubility is diffused into the seeds before the bulk of the monomer is used to swell the seeds. The effect is based on entropy and not particularly in the chemical nature of the organic compound. Conveniently the polymerization initiator may be used for this purpose. Organic solvents, e.g. acetone or a relatively small portion of the monomer, may be used to enhance diffusion of the organic compound into the seeds. This "Ugelstad polymerization process", which is described for example in EP-B-3905 (Sintef) and U.S. Pat. No. 4,530,956 (Ugelstad), may be used to produce monodisperse particles, if necessary carrying out several swelling and polymerization stages to reach the desired particle size.

WO 92/16581 (Cornell Research Foundation) also describes the preparation of monodisperse particles, particularly macroporous polymer beads. The process described uses a three phase emulsion containing soluble polymer particles, a monomer phase, and water. The three phase emulsion also includes an emulsifier and a suspension stabiliser. The polymer particles undergo swelling absorbing the monomer which is then polymerized. In this process the soluble polymer seed particles act as both shape/size regulators and as a porogen. The initial (i.e. before swelling) particles have a diameter of from about 0.5 to 10 µm, 2 to 5 µm being most preferred, and are produced by conventional techniques, such as emulsion or dispersion polymerization.

In a simplified version of the Ugelstad process the enhanced capacity for swelling may be achieved simply by the use of oligomeric seed particles, e.g. where the oligomer weight average molecular weight corresponds to up to 50 monomer units or up to 5000 Dalton.

The processes described in EP-B-3905 and U.S. Pat. No. 4,530,956 (the disclosures of which are hereby incorporated by reference) and the simplified Ugelstad process are relatively complex and inefficient. The processes described in WO 92/16581 do not especially improve upon those disclosed in EP-B-3905 and U.S. Pat. No. 4,530,956. The essence of WO 92/15681 would appear to be the production of macroporous polymer beads of substantially uniform size, the macroporosity being achieved through extraction of the (initially) soluble polymer from the resultant insoluble expanded beads. It is well known in the art that addition of steric stabilizers to dispersion polymerizations of polymer seeds can be useful in controlling size of beads; this feature of WO 92/16581, therefore, appears to represent nothing more than the arbitrary introduction of an obvious and well-known advantageous process feature into the process of the invention.

There is a need for improvements to all these processes, in particular improvements which make it easier to produce monodisperse polymer particles with different chemical or physical characteristics.

It is important to use a polymeric steric stabilizer in the aqueous phase in order to avoid agglomeration of desired-sized particles and formation of undersized particles in the polymerization stage. Surprisingly it has been found that where the swelling generates particles below 25 µm in size undersized particle formation is essentially avoided by the use of polyvinylpyrrolidone (PVP) as a steric stabilizer whereas where the swelling generates particles above 5 µm in size cellulose ethers function effectively as steric stabilizers. While PVP can be used to stabilize particles above 16 µm it is especially preferred for use with particles up to 16 µm.

Thus viewed from one aspect the invention provides a process for the preparation of monodisperse polymer particles which process comprises:

1) either (a) forming an aqueous dispersion comprising (i) monodisperse swellable seed polymer (or oligomer) particles, (ii) droplets comprising an organic compound (e.g. a polymerization initiator) with a molecular weight below 5000 Dalton and a water solubility at 25° C. of less than $10^{-2}$ g/L, (iii) an anionic surfactant, and, optionally, (iv) an organic solvent in which said organic compound is soluble.

and (b) allowing said organic compound to diffuse into said seed particles or (a) forming an aqueous dispersion comprising monodisperse swellable seed oligomer particles and preferably an anionic surfactant;

2) contacting the aqueous dispersion of seed particles with a monomer which, were said organic compound is present, is at least ten times more water soluble than said organic compound, and if required a water-soluble steric stabilizer, if required a porogen, and if required a polymerization initiator, and allowing said monomer to diffuse into said seed particles to form an aqueous dispersion of swollen seed particles; and 3) initiating polymerization of said monomer in an aqueous dispersion of swollen seed particles, characterised in that where the mode diameter of said swollen particles is greater than 5 µm then the aqueous phase of said aqueous dispersion of swollen seed particles during polymerization further contains as a steric stabilizer a water soluble cellulose ether or in that where said mode diameter of said swollen particles is in the range 1 to 25 µm the aqueous phase of said aqueous dispersion of swollen seed particles during polymerization further contains as a steric stabilizer polyvinylpyrrolidone.

Alternatively, the process feature 2) above may instead involve contacting the aqueous dispersion of seed particles with a monomer which, where said organic compound is present, is at least ten times more water soluble than said organic compound, and allowing said monomer to diffuse into said seed particles to form an aqueous dispersion of swollen seed particles, and if required adding a water-soluble steric stabilizer, if required adding a porogen, and if required adding a polymerization initiator.

In the above process, the mode diameter of said swollen particles is preferably more than 15 µm where the aqueous phase of said aqueous dispersion of swollen seed particles during polymerization further contains as a steric stabilizer a water soluble cellulose ether.

Where water soluble cellulose ethers are used when forming the swollen particles, the mode diameter of the swollen particles will preferably be less than 200 µm.

The PVP preferably has a weight average molecular weight of 10 to 2000 kD, more preferably 25 to 1500 kD, especially 30 to 1000 kD. Where the swollen particles have sizes at the lower end of the 1 to 25 µm range it is preferred to use lower molecular weight PVP and where the swollen particles have sizes at the upper end of that range it is preferred to use higher molecular weight PVP. Thus for example 20 to 80 kD, e.g. 30 kD PVP is particularly suitable for swollen particle sizes of up to 8 µm while 900 to 1500 kD PVP is particularly suitable for swollen particle sizes above 8 µm. Examples of suitable such PVP include PVP K30 and PVP K90 (available for example from International Specialty Products and from Fluka).

Examples of suitable cellulose ethers include alkyl celluloses, preferably $C_{1-4}$-alkyl celluloses; and (hydroxyalkyl) alkyl celluloses, preferably (hydroxy-$C_{1-4}$-alkyl)$C_{1-4}$-alkyl celluloses, more preferably (hydroxy-$C_{1-4}$-alkyl)methyl celluloses. Typically, these cellulose ethers have weight average molecular weights in the range 10 to 100 kD, especially 15 to 80 kD. Such materials are available commercially in a range of different degrees of substitution and molecular weight, e.g. as Benecel MP 333C, Benecel MP 651C, Culminal MHPC 1500, Culminal MHPC 400, Walocel MK 400 PFV and Methocel K100. Cellulose ethers which generate a viscosity when in 2% aqueous solution at 21° C. of 50 to 150 mPa.s are especially preferred.

In the present invention, the size increase by volume (i.e. the ratio of the volume of the swollen particles to the volume of the seed particles) is between 30 and 1000 times. It is a preferred embodiment that the corresponding ratio with regard to the increase in diameter is not less than 3.5.

It should be noted that the process steps recited above may represent the final swelling and polymerization stage or an intermediate swelling and polymerization stage in a Ugelstad polymerization process for preparing monodisperse polymer particles.

The mixture which comprises the monomer (or mixture of monomers) is preferably in the form of an aqueous dispersion when it is contacted with the polymer particles. Where a polymerization initiator is contacted with the aqueous dispersion of polymer particles this too is preferably in the form of an aqueous emulsion, preferably also containing a polymerizable or non-polymerizable organic solvent, e.g. alcohols (particularly $C_{1-4}$ alkanols), ethers (especially cyclic ethers), ketones (e.g. acetone), dialkylsulphoxides, dialkylformamides, monomers, etc. Water miscible solvents, such as acetone, are however preferred. The droplet size of both such emulsions is preferably below 5 µm, e.g. 0.1 to 1 µm, particularly 0.3 to 0.6 µm. This may be produced using an intensive mixer, e.g. a pressure homogenizer (such as a Gaulin homogenizer) or a rotor stator mixer. The steric stabilizer, if present, may be added in whole or in part, together with the monomer, to the aqueous dispersion of seed particles; if additional steric stabilizer is required this is preferably added in aqueous solution form. The steric stabilizer concentration in the polymerization medium is preferably 1 to 40 g/L, especially 4 to 25 g/L, for polyvinylpyrrolidone and 0.1 to 10 g/L, especially 1 to 5 g/L, for cellulose ethers.

Figure 1:
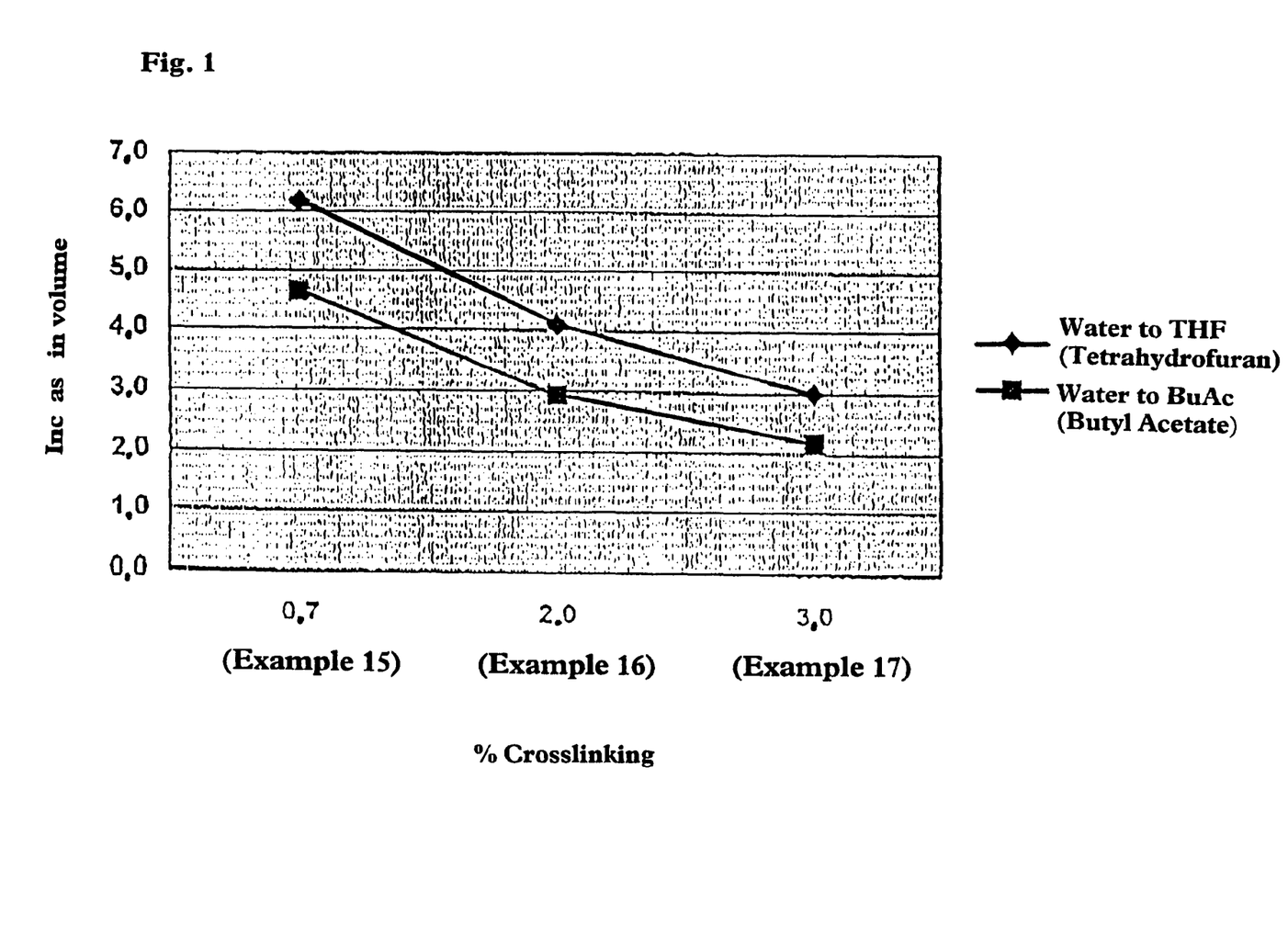
FIG. 1 shows the degree of swelling (by volume) of dispersed particles produced in Examples 15–17, from water to THF and from water to butyl acetate.

In the Ugelstad polymerization process the initial substantially monodisperse seed polymer particles may conveniently be produced by emulsion polymerization. We have found that particularly suitable initial seed particles may be produced by effecting that emulsion polymerization under substantially oxygen-free conditions. Thus viewed from a further aspect the invention provides a process for the preparation of monodisperse polymer particles which comprises:

1) preparing monodisperse swellable seed particles by emulsion polymerization under substantially oxygen-free conditions;

2) where said seed particles are non-oligomeric (and optionally where they are oligomeric), (a) contacting said seed particles with an aqueous dispersion comprising an organic compound (e.g. a polymerization initiator) with a molecular weight below 5000 Dalton and a water solubility at 25° C. of less than $10^{-2}$ g/L, an anionic surfactant and, optionally an organic solvent in which said organic compound is soluble, and (b) allowing said organic compound to diffuse into said seed particles;

3) contacting the aqueous dispersion of seed particles with a monomer which, where said organic compound is used, is at least ten times more water soluble than said organic compound and allowing said monomer to diffuse into said seed particles to form an aqueous dispersion of swollen seed particles, and if required adding a water-soluble steric stabilizer, if required adding a porogen, and if required adding a polymerization initiator; and 4) initiating polymerization of said monomer in an aqueous dispersion containing a steric stabilizer in the continuous phase.

If desired the resulting particles may be further swollen and polymerized to obtain larger monodisperse polymer or oligomer particles. Where any of these stages produces swollen particles having sizes from 1 to 25 µm polyvinylpyrrolidone is preferably used as the steric stabilizer and if it produces swollen particles having sizes above 15 µm a cellulose ether is preferably used as the steric stabilizer. A cellulose ether may also be used as steric stabilizer where the mode diameter of said swollen particles is from 5 to 15 µm. Where the swollen particles have particle sizes below 5 µm, and especially below 2 µm, and especially where the organic compound used is a polymerization initiator, it is convenient to use as the surfactant a $C_{8-16}$ alkyl sulphate or sulphonate, especially a dodecyl sulphate, e.g. sodium dodecyl sulphate, as this serves as both stabilizer and initiator uptake promoter. Where the seed particles have mode particle diameters below 1 µm, the surfactant is especially preferably sodium dodecyl sulphate.

Where the monomer is an amino-functionalized monomer (or where two or more monomers are used and one comonomer is an amino functionalized monomer), it is preferred to add the initiator after the seed particles have been swollen and thus to use as the organic compound (ie. substance I of EP-B-3905) a non-initiator, e.g. a material such as dioctyladipate. For such amino monomers, the initiator is preferably an azo compound, e.g. 2,2'-azobis-(2-methylbutyronitrile) or azo-bis-dimethylvaleronitrile. For other monomers, especially vinyl monomers (e.g. styrene) and acrylic monomers, it is preferred to use a peroxide initiator (e.g. dibenzoyl peroxide, lauroyl peroxide, t-butyl-peroxybenzoate, t-butyl-peroxypivalate and, especially, dioctanoyl peroxide) and to use the initiator as the organic compound which promotes swelling of the seed particles.

Generally, it is preferred to use polymerization initiators that are activated by heat. In this way the initiator and monomer may be brought together within the swollen seed particles at a temperature below that of which polymerization occurs and the aqueous dispersion may then be heated to the temperature at which polymerization is to take place, e.g. 50 to 90° C., more generally 60 to 85° C. During the polymerization, the aqueous dispersion goes through a sticky state and the dispersion should be stirred as gently as possible while still sufficient to maintain a homogeneous dispersion.

In the final swelling and polymerization stage, it is preferred to raise the temperature, e.g. to 70 to 95° C., at the end of the polymerization stage so as to reduce the quantity of residual monomer.

Following preparation of the monodisperse polymer particles of the desired size (which may required two or more swelling and polymerization cycles, e.g. up to 10 such cycles), the polymer particles' surfaces may be derivatised as desired, e.g. by reaction with bifunctional reagents (e.g. diamines) which react with functional groups present in monomers used in the final polymerization stage and serve to introduce the desired functional groups, e.g. amine, carboxyl, epoxy, hydroxyl, etc. Such functional groups may likewise be introduce by the use of a functionalised monomer or comonomer, e.g. glycidyl methacrylate, HEMA, MMA or aminostyrene. Such groups are advantageous as the resultant particles are particularly suitable for end uses in applications such as combinatorial chemistry, peptide synthesis, supported catalysts and chromatographic separation.

Depending on their desired end use, the monodisperse polymer particles may be coated (e.g. with metallic coatings); they may have materials, e.g. magnetic crystals, specific binding partners (e.g. antibodies, avidin or streptavidin, etc.), or catalysts bound to their surface or deposited in pores or on the surface; or they may be expanded (e.g. using blowing agents).

The swelling and polymerization stages are performed in aqueous dispersion in the presence of materials, e.g. surfactants, stabilizers, organic solvents, etc., which it is desirable to remove from the particles. Likewise, where the polymerization produces a cross-linked polymer it may be desirable to remove linear polymers or oligomers which formed the seed particles, for example to avoid leakage during use in chromatography. Generally a water-miscible organic solvent in which the cross-linked polymer is insoluble, or an aqueous solution of such a solvent, may be used for this. However it is particularly suitable to use butyl acetate in this regard in view of its surprising effectiveness in removing undesired residues from the Ugelstad polymerization process. This use forms a further aspect of the present invention. Viewed from this aspect the invention provides a method of cleaning monodisperse polymer particles, in particular particles produced by swelling a seed polymer or oligomer particle in aqueous dispersion and polymerizing a monomer within the swollen seed particles, which method comprises contacting said monodisperse polymer particles with butyl acetate, e.g. by washing or rinsing with butyl acetate or a solution thereof.

The initial polymer seed (i.e. the particles not produced by the Ugelstad swelling and polymerization technique) is preferably prepared by dispersion or emulsion polymerization, in the latter case especially preferably under substantially oxygen-free conditions (e.g. under an inert gas atmosphere, for example a noble gas such as argon, helium, etc.), and with an oxygen content in the aqueous phase of between 0 and 5 ppm, more especially between 0 and 3 ppm, preferably between 0 and 2 ppm, particularly between 0.01 and 2 ppm. This can be achieved by boiling the water before use or, more preferably by purging liquid reagents with nitrogen. When purging liquid reagents with nitrogen, the length of time required depends upon the volume to be purged. For example, when purging a 2 litre vessel, a purging time of between 1 to 50 minutes is preferred, especially preferably purging for at least 10 minutes.

The aqueous phase in the emulsion polymerization contains an anionic surfactant stabilizer, e.g. an $C_{8-16}$ alkyl sulphate such as a decylsulphate, e.g. sodium decylsulphate. This is preferably present at a concentration below its critical micelle concentration.

The unswollen initial seed preferably has a mode particle diameter in the range 0.2 to 1 μm, especially 0.3 to 0.7 μm, more especially 0.4 to 0.6 μm. This can be achieved by mixing monomer, water and surfactant, heating (e.g. to 80° C.) and charging with initiator under vigorous stirring. The initial seeds produced by emulsion polymerization are preferably styrene polymers. Subsequent seeds may conveniently be polymeric or oligomeric.

In the process steps recited above for the processes of the invention, where the polymerization initiator is used as the organic compound (i.e. as substance I of the process of EP-B-3905) it is preferably an organic peroxide, e.g. tert-butyl peroxyneodecanoate or more especially dioctanoyl peroxide (DOP) and it is preferably formed into a fine emulsion using water, the anionic surfactant (preferably sodium dodecyl sulphate or a sulfonate) and an organic solvent, e.g. acetone. The monomer may be but preferably is not used as a solvent for the peroxide initiator; if it is used as a solvent it is preferred that only a relatively small amount of the monomer be used.

In general, emulsification is preferably effected using a high pressure mixer (e.g. a pressure homogenizer), or a rotor stator mixer, to give a mode droplet diameter in the range 0.05 to 5 μm, more preferably 0.05 to 0.5 μm, especially 0.05 to 0.3 μm. During emulsifications, the surfactant is preferably present above its critical micelle concentration, e.g. at a concentration of 3 to 10 g/L, more preferably 4 to 6 g/L (the critical micelle concentration for sodium dodecyl sulphate is about 2.5 g/L). However during polymerization stages, the surfactant is preferably present below its critical micelle concentration, e.g. at less than 1.5 g/L, conveniently 0.1 to 1.0 g/L. This can be achieved either by dilution, for example, with water after emulsion formation but before polymerization initiation. Alternatively, the desired concentration may be achieved by dilution, for example with water or a solution of a steric stabilizer after emulsion formation but before polymerization initiation. As a further alternative, the desired concentration may be realised by adding an appropriately diluted solution of steric stabilizer prior to emulsion formation.

During the uptake of the organic compound by the polymer seed particles, the temperature of the dispersion is preferably maintained between 20 and 50° C. as precipitation may occur at lower temperatures and new particles may form at higher temperatures. Generally temperatures of 25° C.±2° C. are preferred.

During this uptake phase the dispersion is preferably stirred. The time required for uptake is dependant on the seed diameter, the quantity and nature of the organic compound, the emulsion droplet size and the quantity and nature of surfactant and organic solvent. Generally a period of 1 to 5 days, more particularly 2 to 3 days, will be sufficient. Where the organic compound is an initiator it is important that uptake be at least substantially complete so as to avoid out-of-size particles.

The organic solvent concentration in the dispersion during organic compound uptake is conveniently 5 to 15% w/w.

The monomers and comonomers used in the process of the invention are preferably vinyl monomers (e.g. styrene), acrylic monomers and methacrylate monomers and monomers copolymerizable therewith, e.g. styrene, divinylbenzene (DVB), ethyl vinyl benzene, vinyl pyridine, aminostyrene, methyl-styrene, ethylene dimethacrylate, (EDMA), hydroxyethylmethacrylate (HEMA), methyl methacrylate (MMA), glycidyl methacrylate (GMA), vinyl benzyl chloride (VBC), vinylchloride (VC), dimethyl styrene, ethyl styrene, ethyl-methyl-styrene, p-chlorostyrene, 2,4-dichlorostyrene, acrylic acid, methyl acrylate, ethyl acrylate, butylacrylate, methacrylic acid, ethyl methylmethacrylate, maleic acid, maleic anhydride, dimethyl maleate, diethyl maleate, dibutyl maleate, fumaric acid, dimethyl fumarate, diethyl fumarate and acrylonitrile.

In the process of the invention the initial polymer seed, e.g. made by emulsion polymerization, is a polymer. Especially preferably, the initial polymer seed is a styrene homo or copolymer, e.g. a styrene homopolymer or a styrene-divinyl benzene copolymer. Most preferably, initial seeds prepared by emulsion polymerization will be homopolymers, especially polystyrene. Initial seeds prepared by other techniques, e.g. dispersion polymerization may be homopolymers or copolymers, and may be oligomeric or polymeric. Such seeds typically may be 1 to 10 µm in mode diameter and optionally may contain some cross-linker. Initial seeds used in this invention which are produced by emulsion polymerization, on the other hand, are typically of less than or equal to about 1 µm in diameter.

Intermediate seeds may be either polymer or oligomer seeds. Throughout this application, oligomer is intended to refer to polymers having low weight average molecular weight (for example up to 5000 Daltons, e.g. 1000 to 4000 D, especially 1500 to 3000 D), corresponding for example up to 50, more particularly 10 to 25 monomer units. Oligomer seeds have the advantage that their swelling capacity is generally much greater than that of the longer chain polymers.

For intermediate or larger sized seeds, e.g. having a mode particle diameter of about 1 µm or above before swelling, it may be desirable to incorporate a chain transfer agent, e.g. a halogenated alkane as described by Ugelstad in U.S. Pat. No. 4,186,120. This has the advantage of producing a polymer with a bimodal molecular weight distribution in the polymerization stage. The lower molecular weight component results in the particles produced in that polymerization stage having a greater swelling capacity for subsequent swelling and polymerization stages.

As an alternative to the use of a chain transfer agent, a high initiator concentration may be used in oligomer production. In this regard, the techniques of U.S. Pat. No. 4,530,956 (Ugelstad), the disclosure of which is incorporated by reference, may be used.

It is also preferred to include a water-soluble polymerization inhibitor (e.g. potassium iodide) in the aqueous phase to prevent nucleation of particles.

Where a porous product is desired, then a porogen should be incorporated in the swollen seed particles, preferably in at least the final swelling and polymerization stage. As porogens can be used organic substances which are not polymerized in the polymerization stage and which can be removed from the particles after polymerization thereby producing porous particles. Porogens can also be used as blowing agents—particles impregnated with such materials, on heating may expand as the porogen vaporizes. Examples of suitable porogens include organic acids, alcohols, esters, aromatic solvents, optionally substituted aliphatic hydrocarbons having up to 12 carbons, e.g. toluene, cyclohexanol, butyl acetate, propane, pentane, cyclopentane, cyclobutane, heptane, methyl chloride, ethyl chloride, dichlorodifluoromethane, etc. Toluene and n-heptane are preferred, especially in a volume ratio of 1:10 to 10:1, more particularly 1:4 to 4:1. The porogen is conveniently introduced in admixture with the monomer.

By the use of a combination of porogens, at least one of which is a solvent for the polymer produced in the polymerization stage and at least one of which is a not a solvent for that polymer, it is possible to achieve a desired pore size distribution in the resulting porous particles. Thus for example for vinyl polymers (e.g. styrene) toluene can be used as a solvent porogen and n-heptane as a non-solvent porogen. The use of the term "solvent" in this specific context is not intended to convey that the swollen particles are capable of dissolving fully in this solvent, or that the swollen particles are incapable of dissolving to any extent whatsoever in the non-solvent porogen. Thus the combination of the two types of porogen enables the desired pore size distribution in the resulting porous particles to be achieved. This use of a porogen combination forms a further aspect of the invention. Viewed from this aspect the invention provides a process for the preparation of porous monodisperse polymer particles which process comprises:

1) either (a) forming an aqueous dispersion comprising (i) monodisperse swellable seed polymer (or oligomer) particles, (ii) droplets comprising an organic compound (e.g. a polymerization initiator) with a molecular weight below 5000 Dalton and a water solubility at 25° C. of less than $10^{-2}$ g/L, (iii) an anionic surfactant, and, optionally, (iv) an organic solvent in which said organic compound is soluble;

and (b) allowing said organic compound to diffuse into said seed particles, or (a) forming an aqueous dispersion comprising monodisperse swellable seed oligomer particles and preferably an anionic surfactant;

2) contacting the aqueous dispersion of seed particles with a monomer which, where said organic compound is present, is at least ten times more water soluble than said organic compound, and allowing said monomer to diffuse into said seed particles and to form an aqueous dispersion of swollen seed particles and if required adding a water-soluble steric stabilizer, if required adding a porogen, and if required adding a polymerization initiator; and 3) initiating polymerization of said monomer in an aqueous dispersion of swollen seed particles, characterised in that said swollen seed particles contain at least two porogens, at least one of which is a solvent for the polymer produced in step (3) and at least one of which is not a solvent for the polymer produced in step (3).

In this aspect, the ratio with regard to increase in diameter is preferably greater than or equal to 4.5.

In general, a cross-linking monomer (such as divinylbenzene) can be used as 0 to 100% w/w of the monomer diffused into the seeds, for example as at least 30% for the production of porous particles and up to 0.5% for the production of very highly swellable particles.

In the preparation of porous particles and many other particles, it is necessary to include a crosslinking agent or alternatively to use as a monomer or comonomer a compound with more than one polymerization site, e.g. a compound with more than one polymerizable carbon-carbon double bond, for example a diene such as divinyl benzene, or compounds such as hexanediol dimethacrylate, trimethylol propane trimethacrylate and divinyl benzyl ether. Particularly desirably the monodisperse polymer particles produced according to the invention are 30 to 100% divinyl benzene, more especially 60 to 95%, particularly 70 to 90%, more particularly 75 to 82% (where the percentages are by weight of divinylbenzene monomer residue relative to the total monomer residue).

It has been found that the Ugelstad processes can be used particularly effectively to produce functionalized or functionalizable monodisperse particles where the monomer dispersed into the seeds in at least one swelling stage, preferably the final stage, comprises at least two acrylic or methacrylic acid or ester monomers, more preferably at least one being glycidyl methacrylate. Viewed from a further aspect therefore the invention provides a process for the preparation of monodisperse polymer particles which process comprises:

1) either
(a) forming an aqueous dispersion comprising (i) monodisperse swellable seed polymer (or oligomer) particles, (ii) droplets comprising an organic compound (e.g. a polymerization initiator) with a molecular weight below 5000 Dalton and a water solubility at 25° C. of less than $10^{-2}$ g/L, (iii) an anionic surfactant, and, optionally, (iv) an organic solvent in which said organic compound is soluble;
and (b) allowing said organic compound to diffuse into said seed particles;
or
(a) forming an aqueous dispersion comprising monodisperse swellable seed oligomer particles and preferably an anionic surfactant;
2) contacting the aqueous dispersion of seed particles with a monomer which, where said organic compound is present, is at least ten times more water soluble than said organic compound, and allowing said monomer to diffuse into said seed particles to form an aqueous dispersion of swollen seed particles and if required adding a water-soluble steric stabilizer, if required adding a porogen, and if required adding a polymerization initiator; and
3) initiating a polymerization of said monomer in an aqueous dispersion of swollen seed particles, characterised in that said monomer comprises at least two acrylic or methacrylic acid or ester monomers, more preferably at least one being glycidyl methacrylate.

In this aspect, the ratio with regard to increase in diameter is preferably greater than or equal to 4.5.

Coefficient of variation (CV) is determined in percentage as $$CV = \frac{100 \times \text{standard deviation}}{\text{mean}}$$

where mean is the mean particle diameter and standard deviation is the standard deviation in particle size. CV is preferably calculated on the main mode, ie. by fitting a monomodal distribution curve to the detected particle size distribution. Thus some particles below or above mode size may be discounted in the calculation which may for example be based on about 90%, more usually about 99% of total particle number (of detectable particles that is). Such a determination of CV is performable on a Coulter Counter Channelizer 256 particle size analyser.

Embodiments of the invention are illustrated further by the following non-limiting Examples:

EXAMPLE 1

Porous Crosslinked Polystyrene Particles, 30 μm 1400 g of water, 84 g of dioctanoyl peroxide (DOP), 140 g of acetone and 7 g of sodium dodecyl sulphate (SDS) were homogenized in a two stage Manton Gaulin homogenizer with 380 kg/cm² in the first stage and 100 kg/cm² in the second stage for 8–9 min.

After homogenization 178.1 g of the emulsion were charged with a seed suspension of monodisperse oligomeric styrene particles having a particle diameter of 5 μm. There were used 21.9 g of seed suspension containing 19.8 g of water and 2.1 g of oligomeric particles.

After stirring for 3 days at 25° C., 180.8 g of the activated seed particles were charged with an emulsion containing 1683 g of water, 0.6 g of sodium dodecyl sulfate (SDS), 2.6 g of Methocel K100 (HPMC=Hydroxy Propyl Methyl Cellulose), 117 g of 80% divinylbenzene (DVB) [i.e. 80% by weight DVB, 20% by weight ethyl vinyl benzene and other byproducts of DVB production], 223 g of porogen (toluene: n-heptane in a 1:2 volume ratio). The emulsion was homogenized at 330 kg/cm² in the first stage and 50 kg/cm² in the second stage for 6–7 min.

After swelling for 15 hrs at 25° C., 5.3 g of methocel K100 dissolved in 788 g of water were charged to the reactor. The dispersion was then polymerized for 10 hrs at 70° C. A monodisperse suspension was formed having a particle diameter of 30 μm.

The particles were separated from the liquid phase by flotation and the liquid phase was discharged. The particles were then cleaned with 2 litres of methanol by stirring for 1 hour followed by sedimentation. After sedimentation the liquid phase was discharged, new methanol (2 litres) was charged and the described procedure was repeated 4 times. The particle suspension was then sieved through a 100 μm sieving cloth. Then the particle suspension was diafiltered with 6 litres of butylacetate followed by 6.7 liters of methanol. Finally the particles were cleaned by sedimentation and discharging of the liquid phase, with 2 litres of methanol minimum 3 times.

The final product was 30 μm polymer particles in a clear liquid phase without impurities.

EXAMPLE 2

Porous Acrylic Particles, 30 μm 1400 g of water, 84 g of DOP, 140 g of acetone and 7 g of SDS were homogenized in a two stage Manton Gaulin homogenizer with 380 kg/cm² in the first stage and 100 kg/cm² in the second stage for 8–9 min.

After homogenization, 88.4 g of the emulsion were charged with a seed suspension of monodisperse oligomeric styrene particles having a particle diameter of 5 μm. There were used 9.6 g of seed suspension containing 8.75 g of water and 0.85 g of oligomeric particles.

After stirring for 3 days at 25° C., 89 g of the activated seed particles were charged with an emulsion containing 844 g of water, 1.3 g of Methocel K100, 44.9 g of ethylene dimethylacrylate (EDMA), 11.4 g of hydroxy ethyl methacrylate (HEMA), 113 g of porogen (cyclohexanol:butylacetate in a 1:1 volume ratio). The mixture was emulsified with a Ultra Turrax at maximum speed for 10 min.

After swelling for 2 hrs at 25° C., 0.4 g of potassium iodide (KI) dissolved in 395 g of water were charged to the reactor and the dispersion was then polymerized for 1 hr at 50° C., 3 hrs at 60° C. and 1 hr at 70° C. A monodisperse suspension was formed having a particle diameter of 30 μm.

EXAMPLE 3

Solid Polystyrene Particles, 20 μm 1400 g of water, 84 g of DOP, 140 g of acetone and 7 g of SDS were homogenized in a two stage Manton Gaulin homogenizer with 380 kg/cm² in the first stage and 100 kg/cm² in the second stage for 8–9 min.

After homogenization 159 g of the emulsion were charged with a seed suspension of monodisperse oligomeric styrene particles having a particle diameter of 5 μm. There were used 43.9 g of seed suspension containing 39.7 g of water and 4.2 g of oligomeric particles.

After stirring for 2 days at 25° C., 184.4 g of the activated seed particles were charged with an emulsion containing 836 g of water, 1.5 g of Methocel K100, 348.8 g styrene. The emulsion was homogenized at 400 kg/cm² in the first stage and 100 kg/cm² in the second stage for 4–5 min.

After swelling for 2 hrs at 25° C., 3 g of Methocel K100 dissolved in 427 g of water were charged to the reactor and then the dispersion was polymerized for 1 hr at 60° C. and 9 hrs at 70° C. A monodisperse suspension was formed having a particle diameter of 20 μm.

EXAMPLE 4

Solid Crosslinked Polystyrene Particles, 54 μm 1400 g of water, 42 g of DOP, 222 g of acetone and 7 g of SDS were homogenized in a two stage Manton Gaulin homogenizer with 400 kg/cm² in the first stage and 100 kg/cm² in the second stage for 8–9 min.

After homogenization 159 g of the emulsion were charged with a seed suspension of monodisperse oligomeric styrene particles having a particle diameter of 9.5 μm. There were used 17.6 g of the seed suspension containing 16.6 g of water and 1 g of oligomeric particles.

After stirring for 3 days at 25° C., 146.3 g of the activated seed particles were charged with an emulsion containing 1198 g of water, 2.5 g of Methocel K100, 228 g styrene, 7.3 g 65% DVB. The emulsion was homogenized at 400 kg/cm² in the first stage and 100 kg/cm² in the second stage for 5–6 min.

After swelling for 1 hour at 25° C., 0.5 g of Methocel K100 and 0.5 g KI dissolved in 500 g of water were charged to the reactor and then the dispersion was polymerized for 1 hr at 60° C. and 9 hrs at 70° C. A monodisperse particle suspension was formed having a particle diameter of 54 μm.

EXAMPLE 5

Solid Crosslinked Polystyrene Particles, 15 μm 1400 g of water, 84 g of DOP, 140 g of acetone and 7 g of SDS were homogenized in a two stage Manton Gaulin homogenizer with 400 kg/cm² in the first stage and 100 kg/cm² in the second stage for 8–9 min.

After homogenization 75.8 g of the emulsion were charged with a seed suspension of monodisperse oligomeric styrene particles having a particle diameter of 3.2 μm. There were used 22 g of the seed suspension containing 20 g of water and 2 g of oligomeric particles.

After stirring for 1 day at 25° C., 85 g of the activated seed particles were charged with an emulsion containing 784 g of water, 1.25 g of SDS, 204.3 g styrene, 0.37 g of 80% DVB. The emulsion was homogenized at 400 kg/cm² in the first stage and 100 kg/cm² in the second stage for 4–5 min.

After swelling for 5 hrs at 25° C., 15 g of PVP K90 (Poly Vinyl Pyrolidone) and 0.4 g of potassium iodide dissolved in 702 g of water were charged to the reactor and then the dispersion was polymerized for 1 hr at 60° C. and 9 hrs at 70° C. A monodisperse suspension was formed having a particle diameter of 15 μm.

EXAMPLE 6

Porous Crosslinked Polystyrene Particles, 4.5 μm 4970 g of water, 248.5 g of DOP and 24.85 g of SDS were homogenized in a two stage Manton Gaulin homogenizer with 400 kg/cm² in the first stage and 100 kg/cm² in the second stage for 25 min.

After homogenization 3947.6 g of the emulsion were charged with a seed suspension of monodisperse oligomeric styrene particles having a particle diameter of 1 μm. There were used 1691.2 g of the seed suspension containing 1555.2 g of water and 136.0 g of oligomeric particles.

After stirring for 20 hrs at 25° C., 5126.2 g of the activated seed particles were charged with an emulsion containing 42576 g of water, 26.47 g of SDS, 536.5 g of PVP K-30, 2989.7 g of 62.5% DVB, 1991.7 g of styrene and 4727.0 g of porogen (toluene). The emulsion was homogenized at 380 kg/cm² in the first stage and 100 kg/cm² in the second stage for 30 min.

After swelling for 20 hrs at 25° C., 42026.4 g of water were charged to the reactor and then the dispersion was polymerized for 1 hr at 60° C., 4 hrs at 70° C. and 2.5 hrs at 80° C. A monodisperse suspension was formed having a particle diameter of 4.5 μm.

EXAMPLE 7

Porous Crosslinked Polystyrene Particles, 2.8 μm 2630 g of water, 214.4 g of DOP, 291.9 g of acetone and 14.73 g of SDS were homogenized in a two stage Manton Gaulin homogenizer with 400 kg/cm² in the first stage and 100 kg/cm² in the second stage for 25 min.

After homogenization 2994.6 g of the emulsion were charged with a seed suspension of monodisperse polystyrene particles having a particle diameter of 0.5 µm. There were used 341.3 g of seed suspension containing 290.4 g of water and 50.9 g of polymeric particles.

After stirring for 20 hrs at 25° C., 3032.6 g of the activated seed particle suspension were charged with an emulsion containing 43375.1 g of water, 31.42 g of SDS, 1412.7 g of PVP K-30, 2989.6 g of 62.9% DVB, 1998.2 g of styrene and 4780.7 g of porogen (toluene). The emulsion was homogenized at 380 kg/cm² in the first stage and 100 kg/cm² in the second stage for 60 min.

After swelling for 20 hrs at 25° C., 42379.7 g of water were charged to the reactor and then the dispersion was polymerized for 1 hr at 60° C., 4 hrs at 70° C. and 2.5 hrs at 80° C. A monodisperse suspension was formed having a particle diameter of 2.8 µm.

EXAMPLE 8

Porous Crosslinked Polystyrene Particles, 2.6 µm 1548 g of water, 16 g of PVP-K30, 2.4 g SDS, 176.6 g of 63% DVB, 44 g of styrene, 204.6 g of porogen (toluene) and 5.6 g of 2,2'-azobis(2-methylbutyronitrile) (AMBN) were homogenized in a two stage Manton Gaulin homogenizer with 400 kg/cm² in the first stage and 100 kg/cm² in the second stage for 35 min.

After homogenization 1013.4 g of the emulsion were charged with a seed suspension of monodisperse oligomeric styrene particles having a particle diameter of 0.65 µm. There were used 40.4 g of seed suspension containing 36.8 g of water and 3.58 g of oligomeric particles.

After swelling for 20 hrs at 25° C., 8 g PVP K-30, and 0.8 g of potassium iodide dissolved in 794 g of water were charged to the reactor and then the dispersion was polymerized for 1 hr at 60° C., 4 hrs at 70° C. and 2.5 hrs at 80° C. A monodisperse suspension was formed having a particle diameter of 2.6 µm.

EXAMPLE 9

Preparation Of Initial Seed Particles, 0.5 µm 280 g styrene was extracted with 500 ml 10 wt. % sodium hydroxide and then washed with water to pH7 and then flushed with argon for 10 min. In a 2 L rector 1400 g of water and 0.53 g of borax were heated to 80° C., and 100 g water was evaporated off to remove oxygen. Then 0.56 g sodium decyl sulphate in 50 ml boiled water was charged and stirred for 10 min, then the washed and substantially oxygen free styrene was charged and stirred for 15 min. Then 0.84 g potassium peroxodisulphate was charged in 100 ml boiled water. The mixture was kept at 80° C. in an argon atmosphere for 13 hours. A monodisperse suspension of polymeric particles was formed having a particle diameter of 0.5 µm.

EXAMPLE 10

Solid Methacrylic Particles With Amine Groups, 6 µm 900 g of water, 90 g of DOP, 90 g of acetone and 5.4 g of SDS were homogenized in a two stage Manton Gaulin homogenizer with 380 kg/cm² in the first stage and 100 kg/cm² in the second stage for 6–7 min.

After homogenization 77.0 g of the emulsion were charged with a seed suspension of monodisperse oligomeric styrene particles having a particle diameter of 1 µm. There were used 14.5 g of seed suspension containing 13.2 g of water and 1.3 g of oligomeric particles.

After stirring for 1 day at 25° C., 83.3 g of the activated seed particles were charged with 864.6 g of water, 2.0 g of SDS, 158.9 g of methyl methacrylate (MMA), 45.4 g glycidyl methacrylate (GMA) and 22.7 g ethylene glycol-dimethacrylate (EDMA).

After swelling for 15 hrs at 25° C., 788 g of water were charged to the reactor and then the dispersion was polymerized for 6 hrs at 70° C. Then 38.4 g ethylenediamine were charged to the reactor and then reaction was allowed to proceed for 18 hrs. A monodisperse suspension was formed having a particle diameter of 6 µm.

EXAMPLE 11

Core And Shell Particles, 10 µm

Step 1

1200 g of water, 120 g of DOP, 240 g of acetone and 7.2 g of SDS were homogenized in a two stage Manton Gaulin homogenizer with 400 kg/cm² in the first stage and 100 kg/cm² in the second stage for 7–8 min.

After homogenization 83 g of the emulsion were charged with a seed suspension of monodisperse polystyrene particles having a particle diameter of 2 µm. There were used 7.9 g of the seed suspension containing 6.5 g of water and 1.4 g of polymeric particles.

After stirring for 1 day at 25° C., acetone was removed by evaporation under vacuum and 71 g of the activated seed particles were charged with 907 g of water, 2.1 g of SDS, 138.4 g of methylstyrene, 34.6 g of 55% DVB.

After swelling for 20 hrs at 25° C., 0.4 g of KI dissolved in 647 g of water were charged to the reactor and then polymerized for 5 hrs at 70° C. (core). Then the batch was cooled down to 25° C.

Step 2

550 g of the suspension of step 1 was taken and the aqueous was charged with 0.1 g of Methocel J 75 MS (Hydroxy Propyl Methyl Cellulose), 0.05 g of KI and 0.1 g of SDS dissolved in 230 g of water. To this batch was added a mixture of 15.6 g MMA, 12.5 g of GMA and 3.1 g of EDMA.

After stirring for 2 hrs at 25° C., the temperature was raised to 65° C. for 1 hr at further to 70° C. for 5 hrs. The final mixture was monodisperse and contained particles having a diameter of about 10 µm.

EXAMPLE 12

Solid Polystyrene Particles With Chlorine Groups, 200 µm 1370 of water, 82 g of DOP, 205 g of acetone and 8.2 g of SDS were homogenized in a two stage Manton Gaulin homogenizer with 400 kg/cm² in the first stage and 100 kg/cm² in the second stage for 8–9 min.

After homogenization, 166 g of the emulsion were charged with a seed suspension of monodisperse oligomeric styrene particles having a particle diameter of 71 µm. There were used 79 g of the seed suspension containing 71.2 g of water and 7.8 g of oligomeric particles.

After stirring for 2 days at 25° C., 22 g of the activated seed particles were charged with an emulsion containing 1583 g of water, 8.5 g of Methocel K100, 124.4 g styrene, 3 g of 62.8% DVB, 58.5 g of Vinyl Benzyl Chloride (VBC). The emulsion was homogenized at 400 kg/cm$^2$ in the first stage and 100 kg/cm$^2$ in the second stage for 5–6 min.

After swelling for 1 hr at 25° C., the temperature was raised to 60° C. for 1 hr and further to 70° C. for 10 hrs. A monodisperse suspension was formed having a particle diameter of 200 μm.

EXAMPLE 13

Porous Crosslinked Polystyrene Particles Containing Amine Functionality, 30 μm 1500 g of water, 119 g of bis(2-ethylhexyl)adipate, 152 g of acetone and 8 g of sodium dodecyl sulphate (SDS) were homogenized in a two stage Manton Gaulin homogenizer at 400 kg/cm$^2$ in the first stage and 100 kg/cm$^2$ in the second stage for 8–9 min.

After homogenization, 499 g of the emulsion was charged with a seed suspension of monodisperse oligomeric styrene particles having a particle diameter of 5 μm. 93 g of a seed suspension containing 8 g of oligomeric particles and 85 g of water was used.

After stirring at 45° C. for 1 day, 96.9 g of the seed suspension containing activated seed particles were charged to 1097.7 g of an emulsion containing 798.3 g of water, 1.2 g of Methocel K-100, 0.3 g of sodium dodecyl sulphate 34.74 g of 80% divinylbenzene (DVB) [i.e. 80% by weight DVB, 20% by weight ethyl vinyl benzene and other byproducts in DVB production], 52.8 g of styrene, 4.2 g of 2,2'-azobis(2-methylbutyronitrile) and 205.7 g of toluene. The emulsion was homogenized at 400 kg/cm$^2$ in the first stage and 100 kg/cm$^2$ in the second stage for 8–9 min.

After swelling at 25° C. for 0.5 hours, a mixture of 299.8 g of water, 0.5 g of Methocel K-100, 0.1 g of sodium dodecyl sulphate and 5.1 g of 4-amino-styrene was charged and the swelling continued for additional 3 hours. 506.2 g of water and 3.37 g of Methocel K-100 were then charged to the reactor. The dispersion was then polymerized for 1 hour at 60° C. and 17 hours at 70° C., yielding a suspension of particles having a diameter of 30 μm.

The particles were cleaned as described in Example 1.

EXAMPLE 14

Porous Crosslinked Polystyrene Particles Containing Amine Functionality, 30 μm 850 g of water, 110.50 g of bis(2-ethylhexyl)adipate, 141.95 g of acetone and 4.25 g of sodium dodecyl sulphate (SDS) were homogenized in a two stage Manton Gaulin homogenizer at 400 kg/cm$^2$ in the first stage and 100 kg/cm$^2$ in the second stage for 8–9 min.

After homogenization, 102.68 g of the emulsion was charged with a seed suspension of monodisperse oligomeric styrene particles having a particle diameter of 5 μm. 27.21 g of seed suspension containing 1.71 g of oligomeric particles and 26.2 g of water was used.

After stirring at 45° C. for 24 hours, 87.06 g of the seed suspension containing activated seed particles were charged to 1436.08 g of an emulsion containing 1035.84 g of water, 1.58 g of Methocel K-100, 0.5 g of sodium dodecyl sulphate, 53.41 g of 80% divinylbenzene (DVB) [i.e. 80% by weight DVB, 20% by weight ethyl vinyl benzene and other byproducts in DVB production], 56.07 g of styrene, 6.71 g of 2,2'-azobis(2-methylbutyronitrile), 269.41 g of toluene and 12.56 g of 4-amino-styrene. The emulsion was homogenized without addition of 4-amino-styrene at 400 kg/cm$^2$ in the first stage and 100 kg/cm$^2$ in the second stage for 8–9 min before the emulsion was mixed with 4-amino-styrene.

After swelling at 27° C. for 1 hour, a mixture of 473.69 g of water and 3.16 g of Methocel K-100 was then charged to the reactor. The dispersion was then polymerized for 1 hour at 60° C. and 10 hours at 70° C., yielding a suspension of particles having a diameter of 30 μm.

The particles were cleaned as described in Example 1.

EXAMPLE 15

Crosslinked Polystyrene Particles Containing Amine Functionality, 32 μm 1380 g of water, 179 g of bis(2-ethylhexyl)adipate, 230 g of acetone and 7 g of sodium dodecyl sulphate (SDS) were homogenized in a two stage Manton Gaulin homogenizer at 400 kg/cm$^3$ in the first stage and 100 kg/cm$^3$ in the second stage for 10–12 minutes.

After homogenization 292 g of the emulsion was charged with a seed suspension of monodisperse oligomeric styrene particles having a particle diameter of 5 μm. 79 g of seed suspension containing 7 g of oligomeric particles and 72 g of water was used.

After stirring at 45° C. for 1 day, 52.5 g of the seed suspension containing activated seed particles were charged to 850.5 g of an emulsion containing 0.9 g of Methocel K-100, 0.3 g of sodium dodecyl sulphate (SDS), 2.1 g of divinylbenzene (DVB) [i.e. 80% by weight DVB, 20% by weight ethyl vinyl benzene and other byproducts in DVB production], 174.1 g of styrene, 58.7 g of amino styrene, and 12.9 g of 2,2'-azobis(2-methylbutyronitrile). The mixture was emulsified for 10 minutes by using an Ultra Turax mixer.

After swelling at 27° C. for 1 hour, 281.6 g of water and 1.9 g of Methocel K-100 were charged to the reactor. The dispersion was then polymerized for 1 hour at 60° C. and 10 hours at 70° C., yielding a suspension of particles having diameter of 32 μm.

The particles were cleaned as described in Example 1. Diameter was measured on particles dispersed in water, butylacetate and tetrahydrofuran respectively.

EXAMPLE 16

Crosslinked Polystyrene Particles Containing Amine Functionality, 35 μm 1380 g of water, 179 g of bis(2-ethylhexyl)adipate, 230 g of acetone and 7 g of sodium dodecyl sulphate (SDS) were homogenized in a two stage Manton Gaulin homogenizer at 400 kg/cm$^3$ in the first stage and 100 kg/cm$^3$ in the second stage for 10–12 minutes.

After homogenization, 292 g of the emulsion was charged with a seed suspension of monodisperse oligomeric styrene particles having a particle diameter of 5 μm. 79 g of seed suspension containing 7 g of oligomeric particles and 72 g of water was used.

After stirring at 45° C. for 1 day, 52.2 g of the seed suspension containing activated seed particles were charged to 850.5 g of an emulsion containing 0.9 g of Methocel K-100, 0.3 g of sodium dodecyl sulphate (SDS), 5.9 g of divinylbenzene (DVB) [i.e. 80% by weight DVB, 20% by weight ethyl vinyl benzene and other byproducts in DVB production], 166.0 g of styrene, 63.0 g of amino styrene and 12.9 g of 2,2'-azobis(2-methylbutyronitrile). The mixture was emulsified for 10 minutes by using an Ultra Turax mixer.

After swelling at 27° C. for 1 hour, 281.6 g of water and 1.9 g of Methocel K-100 were charged to the reactor. The dispersion was then polymerized for 1 hour at 60° C. and 10 hours at 70° C., yielding a suspension of particles having diameter of 35 μm.

The particles were cleaned as described in Example 1. Diameter was measured on particles dispersed in water, butylacetate and tetrahydrofuran respectively.

EXAMPLE 17

Crosslinked Polystyrene Particles Containing Amine Functionality, 35 μm 1380 g of water, 179 g of bis(2-ethylhexyl)adipate, 230 g of acetone and 7 g of sodium dodecyl sulphate (SDS) were homogenized in a two stage Manton Gaulin homogenizer at 400 kg/cm³ in the first stage and 100 kg/cm³ in the second stage for 10–12 minutes.

After homogenization, 292 g of the emulsion was charged with a seed suspension of monodisperse oligomeric styrene particles having a particle diameter of 5 μm. 79 g of seed suspension containing 7 g of oligomeric particles and 72 g of water was used.

After stirring at 45° C. for 1 day, 52.2 g of the seed suspension containing activated seed particles were charged to 850.5 g of an emulsion containing 0.9 g of Methocel K-100, 0.3 g of sodium dodecyl sulphate (SDS), 8.8 g of divinylbenzene (DVB) [i.e. 80% by weight DVB, 20% by weight ethyl vinyl benzene and other byproducts in DVB production], 167.3 g of styrene, 58.7 g of amino styrene, and 12.9 g of 2,2'-azobis(2-methylbutyronitrile). The mixture was emulsified for 10 minutes by using an Ultra Turax mixer.

After swelling at 27° C. for 1 hour, 281.6 g of water and 1.9 g of Methocel K-100 were charged to the reactor. The dispersion was then polymerized for 1 hour at 60° C. and 10 hours at 70° C., yielding a suspension of particles having diameter of 35 μm.

The particles were cleaned as described in Example 1. Particle diameter was measured on particles dispersed in water, butyl acetate and tetrahydrofuran respectively.

Elemental analysis showed a content of 3.0 wt. % nitrogen and 0.38 wt. % oxygen.

EXAMPLE 18

Further Functionalisation Of Amine-Functionalised Particles With Carboxyl And Amide Functionality 5 g of the particles produced in Example 17 in methanol were washed with dioxane (3×180 ml), 2.07 g of succinic anhydride was added to the dioxane suspension (96 g). The mixture was heated and mechanically stirred at 40° C. for 3 hours. The particles were washed with dioxane (2×200 ml), methanol (100 ml) and dioxane (200 ml). Ir spectra showed a broad peak at 1750 to 1650 cm$^{-1}$ which indicates formation of both amide and carboxylic acid groups.

Elemental analysis of dried particles showed a content of 2.5 wt. % nitrogen and 9.3 wt. % oxygen. This indicates an amine conversion near 100%.

EXAMPLE 19

Further Functionalisation Of Amine-Functionalised Particles With Amide Functionality 5 g of the particles produced in Example 17 in methanol were washed with dioxane (3×180 ml). 4.23 g of bromoacetic acid bromide and 3.0 g diisopropylethylamine was added to the dioxane suspension (79 g). The mixture was mechanically stirred at 20° C. for 1 hour. The particles were washed with dioxane (2×150 ml), dioxane with 20% water and 1 g diisopropylethylamine (150 ml) and dioxane (2×150 ml).

Ir spectra showed a peak at 1685 cm$^{-1}$ which indicates formation of amide groups.

Elemental analysis of dried particles showed a content of 13.2 wt % bromine indicating a conversion of 96%.

EXAMPLE 20

Porous Crosslinked Polystyrene Particles, 5.0 μm 2020.0 g of water, 202.0 of DOP, 202.0 of acetone and 10.10 g of SDS were homogenized in a two stage Manton Gaulin homogenizer with 400 kg/cm² in the first stage and 100 kg/cm² in the second stage for 10 minutes.

After homogenization, 1429.3 g of the emulsion were charged with a seed suspension of monodisperse oligomeric styrene particles having particle diameter of 0.9 μm. There were used 372.8 g of seed suspension containing 341.1 g of water and 31.7 g of oligomeric particles.

After stirring for 23 hours at 25° C., 581.3 g of the activated seed suspension were charged with an emulsion containing 7053.9 g of water, 18.0 g of Methocel K-100, 883.0 g of 80% divinylbenzene (DVB) [i.e. 80% by weight DVB, 20% by weight ethyl vinyl benzene and other byproducts in DVB production], 168.1 g of toluene and 525.6 g of n-heptane. The emulsion was homogenized in a two stage Manton Gaulin homogenizer with 400 kg/cm² in the first stage and 100 kg/cm² in the second stage for 30 minutes.

After swelling for 20 hrs at 25° C., 3234.2 g of water and 35.9 g of Methocel K-100 were charged to the reactor and then the dispersion was polymerized for 1 hour at 60° C. and 10 hours at 70° C. A monodisperse suspension was formed having a particle diameter of 5 μm.

The particles were cleaned as described in Example 1.

The invention claimed is:

1. A process for the preparation of monodisperse polymer particles having diameters of 1 to 6 μm which process comprises:
   forming an aqueous dispersion comprising monodisperse swellable seed particles, an anionic surfactant, and droplets comprising dioctanoyl peroxide;
   contacting the aqueous dispersion of seed particles with a monomer selected from the group consisting of acrylic monomers, methacrylate monomers and vinyl monomers selected from the group consisting of styrene, divinylbenzene (DVB), ethyl vinyl benzene, vinyl pyridine, amino-styrene, methyl-styrene, dimethylstyrene, ethyl styrene, ethyl-methyl-styrene, p-chlorostyrene and 2,4-dichlorostyrene;
   allowing the monomer to diffuse into the seed particles to form an aqueous dispersion of swollen seed particles; and initiating polymerization of the monomer in the aqueous dispersion of swollen seed particles wherein the aqueous phase of the aqueous dispersion of swollen seed particles during polymerisation further containing as a steric stabilizer a polyvinylpyrrolidone.

2. A process for the preparation of monodisperse polymer particles having diameters of 1 to 6 μm which process comprises:
   forming an aqueous dispersion comprising monodisperse swellable seed particles and an anionic surfactant;
   contacting the aqueous dispersion of seed particles with a monomer selected from the group consisting of acrylic monomers, methacrylate monomers and vinyl monomers selected from the group consisting of styrene, divinylbenzene (DVB), ethyl vinyl benzene, vinyl pyridine, amino-styrene, methyl-styrene, dimethylstyrene, ethyl styrene, ethyl-methyl-styrene, p-chlorostyrene and 2,4-dichlorostyrene;
   allowing the monomer to diffuse into the seed particles to form an aqueous dispersion of swollen seed particles; and
   initiating polymerization of the monomer in the aqueous dispersion of swollen seed particles wherein the aqueous phase of the aqueous dispersion of swollen seed particles during polymerisation further contains as a steric stabilizer a polyvinylpyrrolidone;
   wherein the monodisperse swellable seed particles are monodisperse swellable seed oligomer particles.

3. A process for the preparation of monodisperse polymer particles having diameters of 1 to 6 μm which process comprises:
   forming an aqueous dispersion comprising monodisperse swellable seed particles, an anionic surfactant, and droplets comprising dioctyladipate;
   contacting the aqueous dispersion of seed particles with a monomer selected from the group consisting of acrylic monomers, methacrylate monomers and vinyl monomers selected from the group consisting of styrene, divinylbenzene (DVB), ethyl vinyl benzene, vinyl pyridine, amino-styrene, methyl-styrene, dimethylstyrene, ethyl styrene, ethyl-methyl-styrene, p-chlorostyrene and 2,4-dichlorostyrene;
   allowing the monomer to diffuse into the seed particles to form an aqueous dispersion of swollen seed particles; and
   initiating polymerization of the monomer in the aqueous dispersion of swollen seed particles wherein the aqueous phase of the aqueous dispersion of swollen seed particles during polymerisation further contains as a steric stabilizer a polyvinylpyrrolidone;
   wherein the monomer is an amino-functionalized monomer and a polymerization initiator is added after the seed particles have been swollen.

4. A process for the preparation of monodisperse polymer particles which process comprises:
   forming an aqueous dispersion comprising monodisperse swellable seed particles and an anionic surfactant;
   contacting the aqueous dispersion of seed particles with a monomer;
   allowing the monomer to diffuse into the seed particles to form an aqueous dispersion of swollen seed particles having a mode diameter in the range 5 to 200 μm; and
   initiating polymerization of the monomer in the aqueous dispersion of swollen seed particles, wherein the aqueous phase of the aqueous dispersion of swollen seed particles during polymerisation further contains as a steric stabilizer a water soluble cellulose ether of weight average molecular weight 10 to 100 kD.

5. The process of claim 4 wherein the water soluble cellulose ether is a hydroxy propylmethyl cellulose.

6. The process of claim 4 wherein the mode diameter of the swollen seed particles is in a range of 15 to 200 μm.

7. The process of claim 4 wherein the aqueous dispersion comprises droplets comprising an organic compound with a molecular weight below 5000 Dalton and a water solubility at 25° C. of less than $10^{-2}$ g/L.

8. The process of claim 7 wherein said aqueous dispersion comprises an organic solvent.

9. The process of claim 7, further comprising the step of allowing the organic compound to diffuse into the seed particles.

10. The process of claim 7, wherein the organic compound is dioctanoyl peroxide.

11. The process of claim 7, wherein the monomer is at least 10 times more water soluble than the organic compound.

12. The process of claim 4, wherein the aqueous dispersion is contacted with a porogen.

13. The process of claim 4, wherein the aqueous dispersion is contacted with a polymerization initiator.

14. The process of claim 4, wherein the monodisperse swellable seed particles are monodisperse swellable seed oligomer particles.

15. The process of claim 4, wherein the monomer comprises at least 30% by weight divinyl benzene.

16. The process of claim 7, wherein the monomer is an amino-functionalized monomer, the organic compound is an non-initiator, and a polymerization initiator is added after the seed particles have been swollen.

17. The process of claim 16 wherein the non-initiator is dioctyladipate.

18. The process of claim 16 wherein the polymerization initiator is 2,2'-azobis-(2-methylbutyronitrile).

19. The process of claim 4 wherein the anionic surfactant is sodium dodecyl sulphate.

20. The process of claim 4, further comprising the step of coating the monodisperse polymer particles.

21. The process of claim 4, further comprising the step of impregnating the monodisperse polymer particles.

22. The process of claim 4, further comprising the step of derivatizing the monodisperse polymer particles.

23. A process for the preparation of monodisperse polymer particles having a diameter of at least 16 μm which process comprises:
   forming an aqueous dispersion comprising monodisperse swellable seed particles and an anionic surfactant;
   contacting the aqueous dispersion of seed particles with a monomer;
   allowing the monomer to diffuse into the seed particles to form an aqueous dispersion of swollen seed particles; and
   initiating polymerization of the monomer in the aqueous dispersion of swollen seed particles to produce a polymer, wherein the swollen seed particles contain at least two porogens, at least one of which is a solvent for the polymer produced and at least one of which is not a solvent for the polymer produced and at least one porogen is an aliphatic hydrocarbon having up to 12 carbon atoms.

24. A process as claimed in claim 23 wherein the porogens comprise toluene and n-heptane.

25. The process of claim 23, wherein the aqueous phase of the aqueous dispersion of swollen seed particles during polymerization comprises a steric stabilizer selected from the group consisting of water soluble cellulose ether and polyvinylpyrrolidone.

26. The process of claim 23, wherein the aqueous dispersion comprises droplets comprising an organic compound with a molecular weight below 5000 Dalton and a water solubility at 25° C. of less than $10^{-5}$ g/L.

27. The process of claim 26, wherein the aqueous dispersion comprises an organic solvent.

28. The process of claim 26, further comprising the step of allowing the organic compound to diffuse into the seed particles.

29. The process of claim 26, wherein the organic compound is dioctanoyl peroxide.

30. The process of claim 26, wherein the monomer is at least 10 times more water soluble than the organic compound.

31. The process of claim 23, wherein the aqueous dispersion is contacted with a polymerization initiator.

32. The process of claim 23, wherein the monodisperse swellable seed particles are monodisperse swellable seed oligomer particles.

33. The process of claim 23, wherein the monomer comprises at least 30% by weight divinyl benzene.

34. The process of claim 26, wherein the monomer is at amino-functionalized monomer, the organic compound is an non-initiator, and a polymerization initiator is added after the seed particles have been swollen.

35. The process of claim 34, wherein the non-initiator is dioctylapidate.

36. The process of claim 34, wherein the polymerization initiator is 2,2'-azobis-(2-methylbutyronitrile).

37. The process of claim 23, wherein the anionic surfactant is sodium dodecyl sulfate.

38. The processor of claim 23, further comprising the step of coating the monodisperse polymer particles.

39. The process of claim 23, further comprising the step of impregnating the monodisperse polymer particles.

40. The process of claim 23, further comprising the step of derivatizing the monodisperse polymer particles.

41. A process for the preparation of monodisperse polymer particles which process comprises
forming an aqueous dispersion comprising monodisperse swellable seed particles and an anionic surfactant;
contacting the aqueous dispersion of seed particles with at least two monomers;
allowing the monomers to diffuse into the seed particles to form an aqueous dispersion of swollen seed particles that swell at least 3.5 times in diameter; and
imitating polymerization of the monomers in the aqueous dispersion of swollen seed particles to produce polymer particles;
wherein at least two monomers are selected from the group consisting of acrylic, methacrylic acid and ester monomers and combinations of these monomers; and
wherein the aqueous phase of the aqueous dispersion of swollen seed particles during polymerisation further contains a steric stabilizer.

42. The process of claim 41, wherein at least one of the monomers is glycidyl methacrylate.

43. The process of claim 41, wherein the aqueous dispersion comprises droplets comprising an organic compound with a molecular weight below 5000 Dalton and a water solubility at 25° C. of less than $10^{-2}$ g/L and optionally an organic solvent.

44. The process of claim 43, wherein the monomer is at least 10 times more water soluble than the organic compound.

45. The process of claim 43, wherein at least one of the monomers is an amino-functionalized monomer, the organic compound is an non-initiator, and a polymerization initiator is added after the seed particles has been swollen.

46. The process of claim 45, wherein the non-initiator is dioctylapidate.

47. The process of claim 45, wherein the polymerization initiator is 2,2'-azobis-(2-methylbutyronitrile).

48. The process of claim 41, wherein the anionic surfactant is sodium dodecyl sulfate.

49. The process of claim 41, further comprising the step of coating the monodisperse polymer particles.

50. The process of claim 41, further comprising the step of impregnating the monodisperse polymer particles.

51. The process of claim 41, further comprising the step of derivatizing the monodisperse polymer particles.

52. The process of claim 41, wherein the aqueous dispersion is contacted with a porogen.

53. The process of claim 41, wherein the monodisperse swellable seed particles are monodisperse swellable seed oligomer particles.

54. A method of cleaning monodisperse polymer particles produced by swelling seed particles in an aqueous dispersion and polymerizing a monomer with swollen seed particles, the method comprising contacting the monodisperse polymer particles with butyl acetate.

55. The process of claim 16, further comprising the step of coating the monodisperse polymer particles.

56. The process of claim 16, further comprising the step of impregnating the monodisperse polymer particles.

57. The process of claim 16, further comprising the step of derivatizing the monodisperse polymer particles.

58. The process of claim 34, further comprising the step of coating the monodisperse polymer particles.

59. The process of claim 34, further comprising the step of impregnating the monodisperse polymer particles.

60. The process of claim 34, further comprising the step of derivatizing the monodisperse polymer particles.

61. A process for the preparation of monodisperse seed particles, the process comprising:
emulsion polymerising monomer in an aqueous dispersion in the presence of an anionic surfactant employed as an emulsifier under substantially oxygen free conditions to form swellable seed particles having a mode diameter in the range 0.2 to 1μm.

62. The process of claim 61 wherein the anionic surfactant is sodium decyl sulphate.

63. The process of claim 61, wherein an aqueous phase of the aqueous dispersion has an oxygen content of between 0 and 5 ppm.

64. The process of claim 41, wherein the steric stabilizer is selected from the group consisting of water soluble cellulose ether and polyvinylpyrrolidone.

65. The process of claim 61, wherein an aqueous phase of the aqueous dispersion has an oxygen content of between 0 and 1 ppm.

66. The process of claim 61, further comprising the steps of:
contacting the seed particles with an aqueous dispersion comprising an organic compound with a molecular weight below 5000 Dalton and a water solubility at 25° C. of less than $10^{-2}$ g/L and an anionic surfactant; and
allowing the organic compound to diffuse into the seed particles;

contacting the aqueous dispersion of seed particles with a monomer which is at dispersion of swollen seed particles; and initiating polymerization of the monomer in the aqueous dispersion of swollen seed particles containing a steric stabiliser in the continuous phase to produce a polymer.

67. The process of claim 66, wherein the aqueous dispersion comprises an organic solvent.

68. The process of claim 66, wherein the aqueous dispersion is contacted with a porogen.

69. The process of claim 66, wherein the aqueous dispersion is contacted with a polymerization initiator.

70. The process of claim 66, wherein the monomer is an amino-functionalized monomer, the organic compound is an non-initiator, and a polymerization initiator is added after the seed particles have been swollen.

71. The process of claim 70, wherein the non-initiator is dioctylapidate.

72. The process of claim 70, wherein the polymerization initiator is 2,2'-azobis-(2-methylbutyronitrile).

73. The process of claim 66, wherein the anionic surfactant is sodium dodecyl sulfate.

74. The process of claim 66, further comprising the step of coating the monodisperse polymer particles.

75. The process of claim 66, further comprising the step of impregnating the monodisperse polymer particles.

76. The process of claim 66, further comprising the step of derivatizing the monodisperse polymer particles.

77. The process of claim 66, wherein the organic compound is dioctanoyl peroxide.

78. The process of claim 1, wherein the dioctanyl peroxide diffuses into the seed particles.

79. The process of claim 1, wherein the aqueous dispersion is contacted with a porogen.

80. The process of claim 1, wheirne the monomer comprises about 30% by weight divinyl benzene.

81. The process of claim 1, wherein the anionic surfactant is sodium dodecyl sulfate.

82. The process of claim 1, further comprising the step of coating the monodisperse polymer particles.

83. The process of claim 1, further comprising the step of impregnating the monodisperse polymer particles.

84. The process of claim 1, further comprising the step of derivatizing the monodisperse polymer particles.

85. The process of claim 2, wherein the aqueous dispersion is contacted with a porogen.

86. The process of claim 2, wherein the monomer comprises about 30% by weight divinyl benzene.

87. The process of claim 2, wherein the anionic surfactant is sodium dodecyl sulfate.

88. The process of claim 2, further comprising the step of coating the monodisperse polymer particles.

89. The process of claim 2, further comprising the step of impregnating the monodisperse polymer particles.

90. The process of claim 2, further comprising the step of derivatizing the monodisperse polymer particles.

91. The process of claim 3, wherein the dioctanyl peroxide diffuses into the seed particles.

92. The process of claim 3, wherein the aqueous dispersion is contacted with a porogen.

93. The process of claim 3, wherein the monomer comprises about 30% by weight divinyl benzene.

94. The process of claim 3, wherein the anionic surfactant is sodium dodecyl sulfate.

95. The process of claim 3, further comprising the step of coating the monodisperse polymer particles.

96. The process of claim 3, further comprising the step of impregnating the monodisperse polymer particles.

97. The process of claim 3, further comprising the step of derivatizing the monodisperse polymer particles.

98. The process of claim 3, wherein the polymerization initiator is 2,2'-azobis-(2-methylbutyronitrile).

* * * * *

UNITED STATES PATENT AND TRADEMARK OFFICE
CERTIFICATE OF CORRECTION

PATENT NO. : 7,217,762 B1
APPLICATION NO. : 09/958431
DATED : May 15, 2007
INVENTOR(S) : Taarneby et al.

It is certified that error appears in the above-identified patent and that said Letters Patent is hereby corrected as shown below:

Column 23, line 35, please delete the word "wheirne" and substitute therefor:
--wherein--

Signed and Sealed this

Twenty-sixth Day of June, 2007

JON W. DUDAS
*Director of the United States Patent and Trademark Office*